Nov. 24, 1931.  G. VERARDO ET AL  1,833,625
CLUTCH MECHANISM FOR A CLOTH STRAIGHTENING MACHINE OR THE LIKE
Filed July 5, 1928   2 Sheets-Sheet 1

INVENTORS
Giovanni Verardo
Guglielmo Centanaro
BY
ATTORNEY

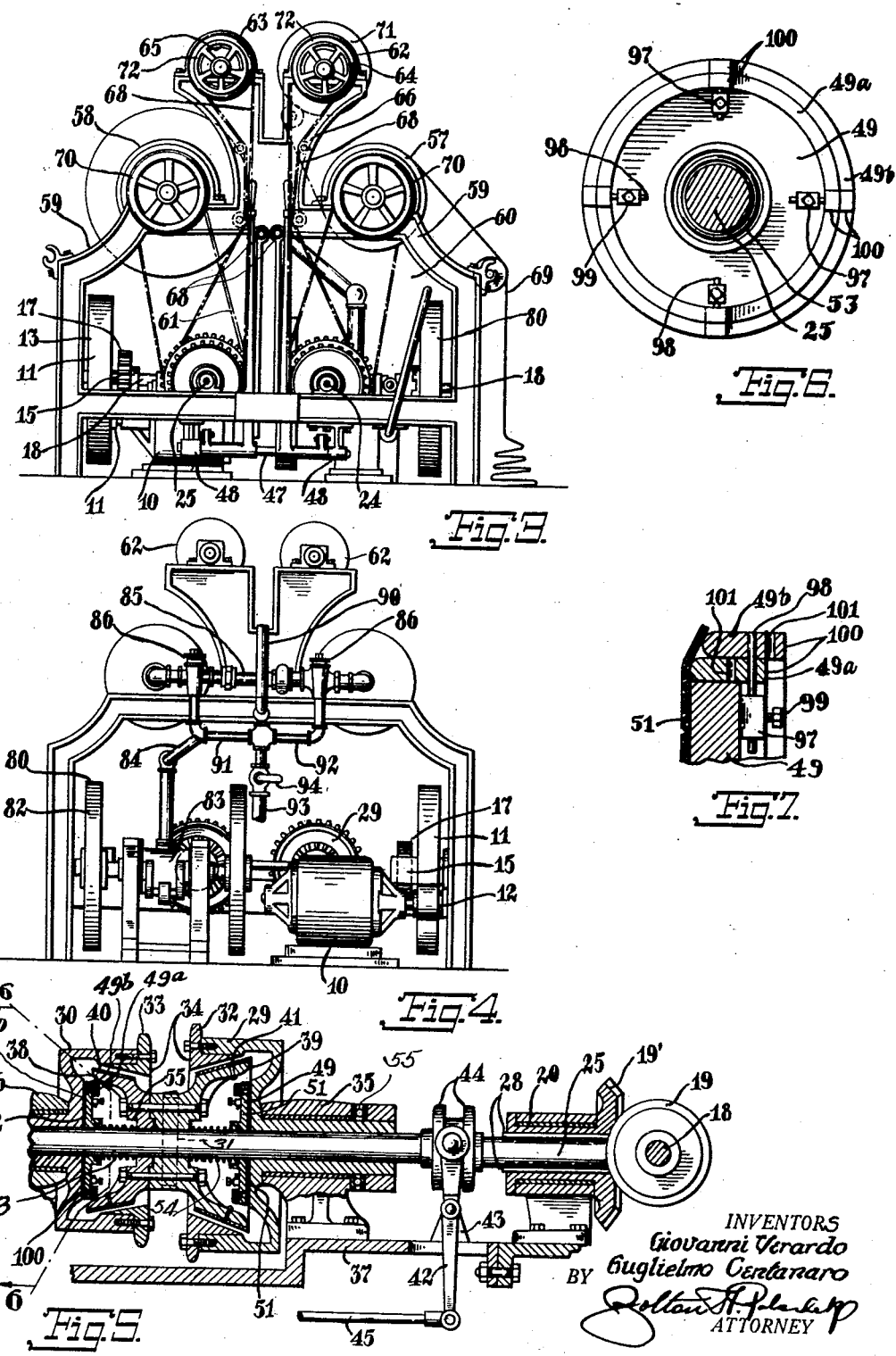

Patented Nov. 24, 1931

1,833,625

UNITED STATES PATENT OFFICE

GIOVANNI VERARDO AND GUGLIELMO CENTANARO, OF NEW YORK, N. Y.

CLUTCH MECHANISM FOR A CLOTH STRAIGHTENING MACHINE OR THE LIKE

Application filed July 5, 1928. Serial No. 290,442.

This invention relates to a new and useful clutch structure for use in a device in the nature of a cloth straightening or ironing machine particularly adapted to steam the cloth after the said cloth has been completely wound around the cylinder, and the cloth is also dried while in this position.

The object of the invention is to provide a device of the class mentioned of novel construction and arrangement of parts, hereinafter more fully described, claimed and illustrated in the accompanying drawings.

Fig. 3 is a front elevational view thereof.

Fig. 4 is a rear elevational view thereof.

Fig. 5 is an enlarged detail view of the clutch mechanism as embodied in our improved machine.

Fig. 6 is a vertical sectional view, taken on the line 6—6 of Fig. 5.

Fig. 7 is an enlarged fragmentary view of a portion of Fig. 5, but showing the adjustment rings in a different position.

Figure 1:
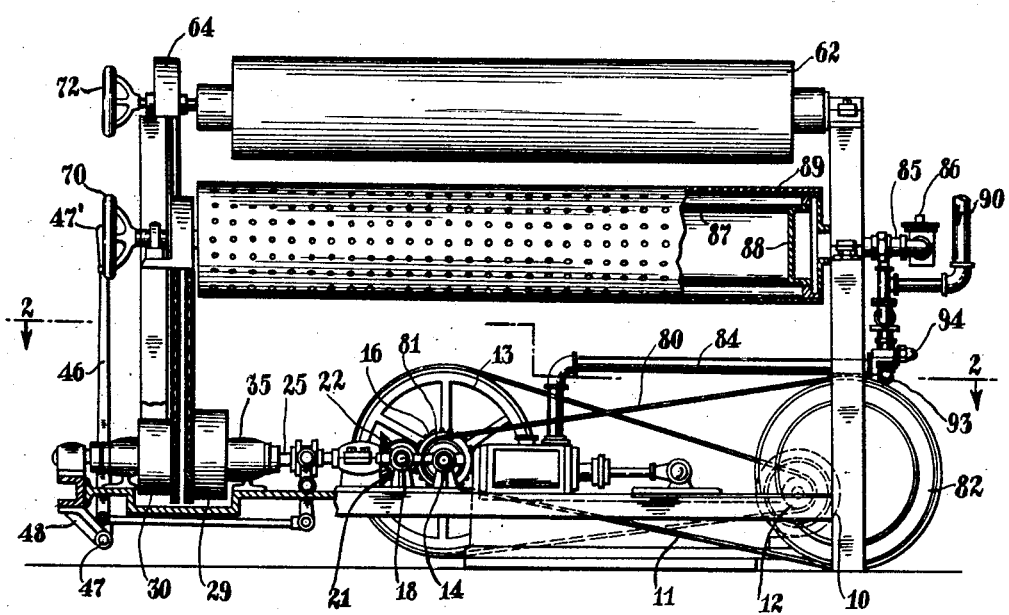
Fig. 1 is a side elevational view of our improved machine, partly in section and provided with the clutch structure.
Figure 2:
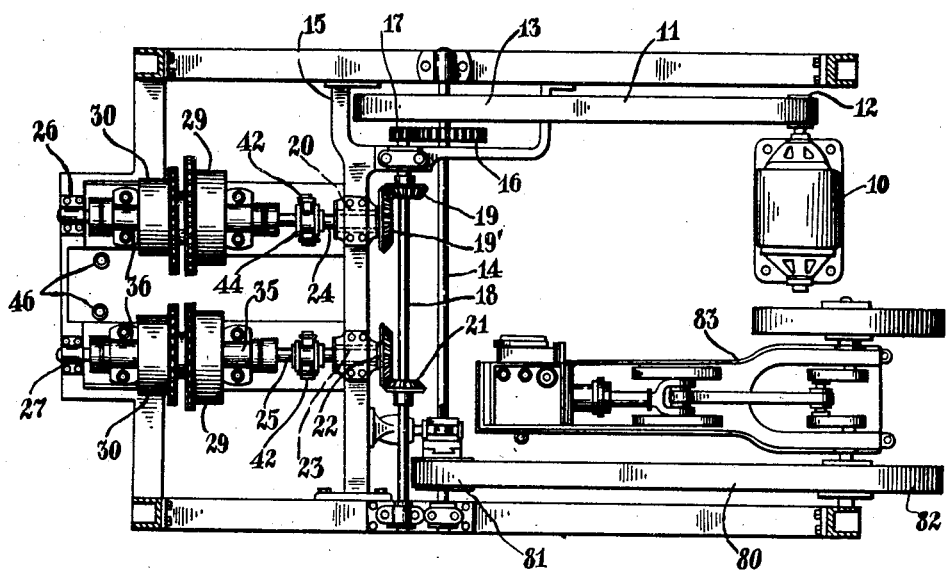
Fig. 2 is a longitudinal sectional view taken on the line 2—2 of Fig. 1.

As here embodied our improved machine comprises an electric motor 10 suitably connected to any convenient source of electric current. The belt 11 is extended over a pulley 12 attached to the armature shaft of the electric motor 10, and over a pulley 13 attached to the shaft 14 rotatably mounted in brackets attached to the frame work 15. The gear 16 is attached to the shaft 14, and meshes with a pinion 17 attached to the shaft 18. The bevel pinion 19 is attached to the shaft 18 and meshes with the bevel gear 19' integral with the collar 20 rotatively mounted in a bearing attached to the frame work 15. The bevel pinion 21 is attached to the shaft 18, and meshes with the bevel gear 22, integral with the collar 23, rotatively mounted in a bearing attached to the framework 15.

Referring in particular to the figures of the accompanying drawings in which we have shown the clutch mechanism as embodied in our improved machine. The shafts 24 and 25 are spliced to the collars 20 and 23, respectively, and are rotatively mounted in the brackets 26 and 27 respectively. The shafts 24 and 25 are keyed as at 28 to the collars 20 and 23, respectively, so as to permit the shafts 24 and 25 to be moved or shifted longitudinally, and so as to permit the electric motor 10 to drive or rotate the shafts 24 and 25, by the mechanism as hereinbefore described. The drums 29 and 30 are rotatively mounted on the shafts 24 and 25, and have attached thereto sprocket wheels 32 and 33, respectively, provided with tapered portions 34. The drums 29 and 30 are supported for rotation by the brackets 35 and 36 respectively, attached to the base member 37 and are held against longitudinal movement by a thrust bearing 55. The cone shaped members 38 and 39 are attached to each other, and are pinned as at 31 to the shafts 24 and 25 so as to move therewith.

The cone shaped members 38 and 39 are provided with facings 40 and 41 adapted to frictionally engage the tapered portions 34 of the sprocket wheels 33 and 32, respectively. The levers 42 are pivotally attached intermediately, to the bracket elements 43 of the base member 37. The levers 42 are adapted to engage in the collars 44, attached to the shafts 24 and 25. The rods 45 are attached to the levers 42, and to the levers 46 intermediate the ends thereof. The levers 46 are pivotally attached as at 47 to the bracket 48 carried by the framework 15. The levers 46 are provided with handle elements 47'. The friction members 49 and 50 of disc shaped construction are rotatively mounted on the shafts 24 and 25, and are provided with facings 51 and 52, adapted to frictionally engage the faces of the drums 29 and 30. Rings 49$^a$ are slidably mounted on the peripheries of the friction members, and second rings 49$^b$ are slidably mounted on the outsides of the first rings. Standards 97 are firmly secured to the friction members, and slidably support rods 98 lockable into fixed positions by set screws 99. The rings 49$^a$ and 49$^b$ are formed with adjacent lugs 100 provided with alignable apertures 101, and the rods 98 engage in these apertures for holding the rings in various positions depending upon which of the apertures are engaged by the rods. In Fig. 5 the rings 49ª and 49ᵇ are shown positioned for holding the friction facings 51 and 52 each in one plane only. In this position of the rings a certain amount of frictional engagement occurs between the friction members and the drums 29 and 30.

In Fig. 7 the rings 49ª and 49ᵇ are shown positioned for holding the friction facings 51 and 52 with their edges turned off of the planes of the central portions. In different positions of the rings the amount of turn-off will be greater, for example if ring 49ª were also moved away from the facings. This arrangement reduces the frictional engagement between the friction members and the drums for adjusting the tensioning of the cloth goods 69 and 71 during winding and unwinding thereof. As shown in Fig. 7 the sides of the rings 49ª and 49ᵇ adjacent the facings, are curved and the facings are secured to the adjacent portion of the said curved sides. The torsion springs 53 are rotatatively mounted on the shafts 24 and 25 and are soldered or otherwise fixed to the friction members 50 and the cone shaped members 38 for transmitting rotation from the cone shaped members to the friction members. Similar torsion springs 54 are rotatively mounted on the shafts 24 and 25 and are soldered or otherwise secured to the friction members 49 and the cone shaped members 39. The rollers 57 and 58 are rotatively mounted in brackets, carried by the upright members 59 of the frame work 15. The rollers 57 and 58 have attached thereto sprocket wheels over which the sprocket chains 60 and 61 respectively, are extended. The sprocket chains 60 and 61 are also extended over the sprocket wheels 32. The rolls 62 and 63 are rotatively mounted in brackets carried by the upright members 59 of the frame work 15. The rolls 62 and 63 have attached thereto sprocket wheels 64 and 65, respectively, over which the sprocket chains 66 and 67 respectively are extended. The sprocket chains 66 and 67 are also extended over guide pulleys 68 rotatively carried by the upright members 59. The sprocket chains 66 and 67 are also extended over the sprocket wheels 33.

Normally the shafts 24 and 25 are in a position so that the cone shaped members 38 and 39 are out of engagement with the tapered portions of the drums 29, 30. In this condition of the device, the springs 53 and 54 urge the friction members 49 and 50 against the drums 29 and 30. This serves to slightly tension the drums permitting rotation under slight pulling but restraining free rolling. The shaft may be moved in one direction for causing one of the friction members to engage one of the drums for positively transmitting rotation from the shaft to the drum, or may be moved in the other direction for causing the other friction member to engage the other of the drums for positively transmitting rotation from the shaft to this particular drum.

When the cloth straightening machine is in operation, the shafts 24 or 25 may be moved for connection with one or the other of the drums. The disconnected drum may turn but is restrained from free rolling by the friction member. This prevents the turning off of cloth much faster than it is drawn which is desirable, and always acts to maintain the cloth in a slightly tensioned position.

The cloth, to be ironed, designated by the reference numeral 69 is wound approximately one turn on the rolls 57 and 58, by turning the hand wheels 70, attached to the rolls 57 and 58. Any suitable material 71 preferably linen, or any similar material of firm texture, is wound on the rolls 62 and 63, by rotating the hand wheels 72 attached to the rolls 62 and 63. The material 71 is placed over the cloth 69. The foregoing described construction is such as will permit the electric motor 10 to wind the cloth 69 and the material 71 on the rolls 57 and 58, and which will permit the cloth 69 to be unwound from the rolls 57 and 58 and which will permit the materials 71 to be unwound from the rolls 57 and 58, and rewound on the rolls 62 and 63. It should be understood that the friction members 49 and 50, will maintain the desired tension on the said rolls, so as to secure the proper winding and unwinding of the cloth 69 and the material 71. It is understood that the material 71 is adapted to form a firm base for the cloth 69. When the clutch mechanism is set so as to rotate the drums or rollers 57 the cloth to be treated is wound thereon and the material 71 is unwound from the rollers 62 and 63 and is wound together with the cloth on the rollers 57 and 58 in superimposed layers, it being understood that the rollers 62 and 57 and the rollers 63 and 58 comprise two separate winding units. As illustrated in Fig. 3 the material 71 is wound on the roller 62 in an anticlockwise direction and on the roller 57 in an anticlockwise direction so that when the roller 62 is rotated in an anticlockwise direction the material 71 is unwound from the roller 57 and rewound onto the roller 62. This winding operation results in a clockwise rotation of the roller 57 which unwinds the cloth 69 therefrom.

The belt 80 is extended over the pulley 81 attached to the above mentioned shaft 14, and over the pulley 82, attached to a drain vacuum pump 83, of ordinary construction. The drain vacuum pump 83 is operatively connected by means of the pipe 84 to the pipe 85 provided with a pair of three way valves 86, of ordinary construction. The pipe 85 is connected to one extremity of the rolls 57 and 58 which are of hollow cylindrical construction, perforated and which are provided with an inner hollow cylindrical member 87, attached thereto by end supporting members 88 so as to provide an annular space 89 between the hollow cylindrical member 87 and the rolls 57 and 58. The pipe 90 is connected to any convenient source of steam pressure and by means of the pipe 91 and 92 to the three way valves 86, a discharge pipe 93 is provided with a shut off valve 94 and is connected to the pipes 91 and 92. The above described construction is such as will permit steam under any desired pressure to be admitted into the rolls 57 and 58 after the process of winding the cloth 71 on the said rolls, and which will permit a partial vacuum to be created in the rolls 57 and 58, by means of the drain vacuum pump 83.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention what we claim as new and desire to secure by United States Letters Patent is:

1. A clutch mechanism for a cloth straightening machine or the like, comprising a shaft slidably and rotatively mounted, cone shaped members attached to each other and on the shaft and having friction facings, a hollow drum having a tapered portion engageable with one friction facing of one of the cone shaped members and held against longitudinal movement, another hollow drum having a tapered portion engageable with the friction facing of the other of the cone shaped members and held against longitudinal movement, friction discs loosely mounted on the shaft, torsion springs disposed coaxially on the shaft and acting between the cone shaped members and the friction discs for urging the friction discs against the drums at slight pressures, and means for moving the shaft one way for engaging one of the cone shaped members with one of the drums and the other way for engaging the other cone shaped member with the other of the drums.

2. A clutch mechanism for a cloth straightening machine or the like, comprising a shaft slidably and rotatively mounted, cone shaped members attached to each other and on the shaft and having friction facings, a hollow drum having a tapered portion engageable with one friction facing of one of the cone shaped members and held against longitudinal movement, another hollow drum having a tapered portion engageable with the friction facing of the other of the cone shaped members and held against longitudinal movement, friction discs loosely mounted on the shaft, means for urging the friction discs against the drums at slight pressures, and means for moving the shaft one way for engaging one of the cone shaped members with one of the drums and the other way for engaging the other cone shaped member with the other of the drums.

3. A clutch mechanism for a cloth straightening machine or the like, comprising a shaft slidably and rotatively mounted, cone shaped members attached to each other and on the shaft and having friction facings, a hollow drum having a tapered portion engageable with one friction facing of one of the cone shaped members and held against longitudinal movement, another hollow drum having a tapered portion engageable with the friction facing of the other of the cone shaped members and held against longitudinal movement, friction discs loosely mounted on the shaft, means for manually adjusting the friction surface of the friction discs, torsion springs disposed coaxially on the shaft and acting between the cone shaped members and the friction discs for urging the friction discs against the drums at slight pressures, and means for moving the shaft one way for engaging one of the cone shaped members with one of the drums and the other way for engaging the other cone shaped member with the other of the drums.

In testimony whereof we have affixed our signatures.

GIOVANNI VERARDO.
GUGLIELMO CENTANARO.